Aug. 12, 1941.         A. G. MacINTYRE         2,252,297
CONTAINER FOR BAKED GOODS AND THE LIKE
Filed Dec. 2, 1938
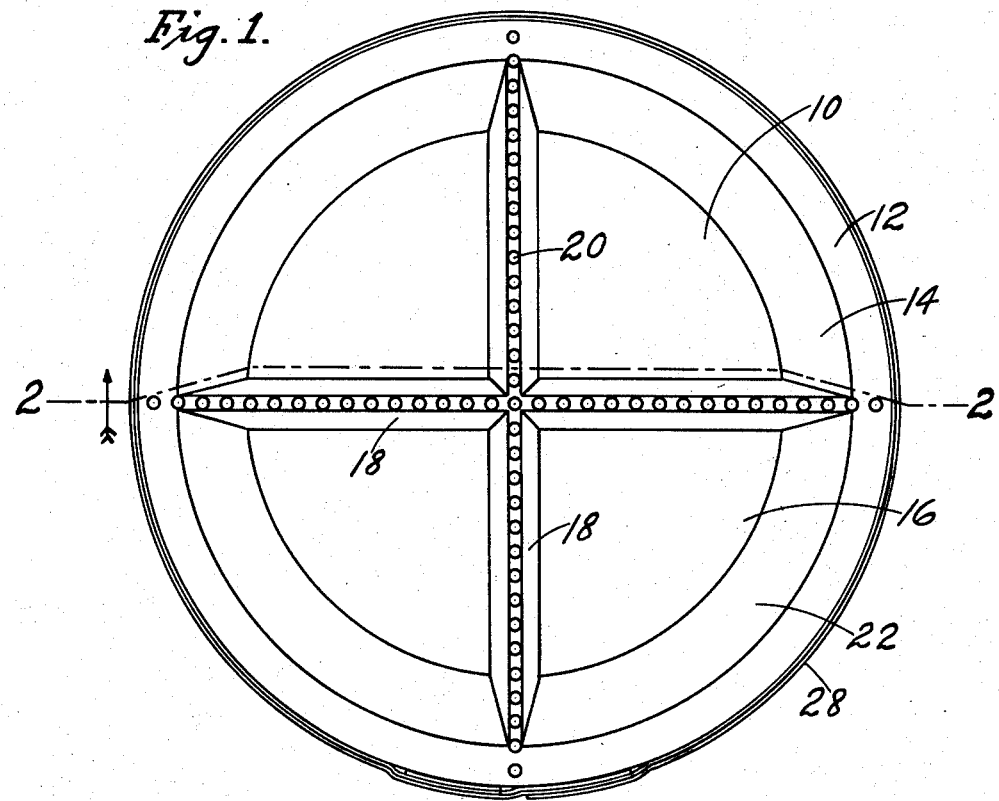
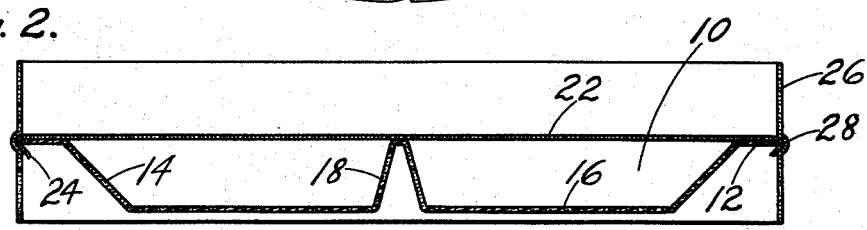
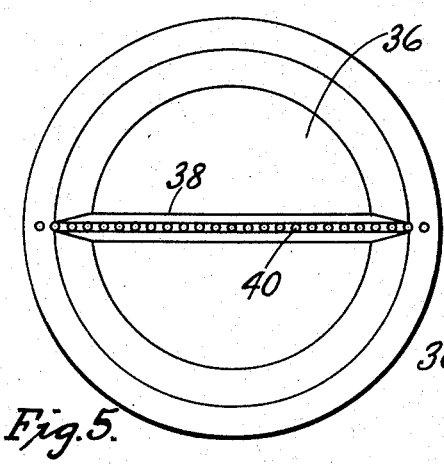
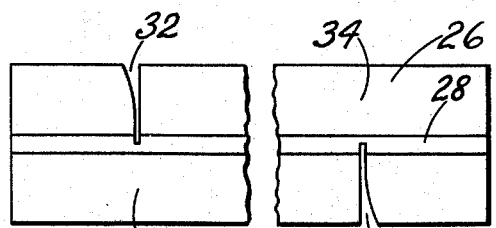
INVENTOR.
Aimwell G. MacIntyre
BY Frederick W. Cotterman
ATTORNEY.

Patented Aug. 12, 1941

2,252,297

UNITED STATES PATENT OFFICE 2,252,297

CONTAINER FOR BAKED GOODS AND THE LIKE

Aimwell G. MacIntyre, Franklin, Ohio, assignor to Jay M. Leach, Dayton, Ohio

Application December 2, 1938, Serial No. 243,602

1 Claim. (Cl. 206—44)

This invention relates to a container for baked goods and the like and is particularly useful in the baking and marketing of pies.

It has for a long time been a difficult problem with bakeries that cater to small outdoor lunch stands and small stands in general to provide a pie small enough for an individual serving, done up in a suitable sanitary container, within a price which the patrons of these stands are willing to pay for their dessert.

Containers for this purpose usually comprise a pan of fire resisting paper in which the pie is both baked and marketed, a transparent cover of Cellophane or similar material over the pie, and an encircling band of heavy paper having some means for supporting the pan and holding the cover in place. The band usually carries the trade-mark and label of the baker.

This type of container is highly satisfactory and extensively employed in the industry, but the difficulty is that a container for a small individual pie has a labor cost of substantially as much as one for a large pie from which four servings are made.

It is therefore an object of this invention to solve this difficulty of reducing the container cost per serving, by providing a container for a large pie with means for dividing the larger pie in several individual servings without the messiness incident to cutting a large pie of the usual type in surroundings having inadequate dining facilities.

I attain this and other objects, advantages, and meritorious features in the device hereinafter described, the embodiment being shown in the accompanying drawing, wherein, Fig. 1 is a top plan view of a container having a pan adapted for four servings and made according to this invention.

Fig. 2 is a vertical section taken at 2—2 of Fig. 1.

Fig. 3 is a side elevation of the band which encircles the pan in Fig. 1 and holds the cover in place, the greater part of the band intermediate the ends being broken out to conserve space.

Fig. 4 is an end view of the band looking from the left end of Fig. 3.

Fig. 5 is a small scale plan view of a two section pan.

Construction

The pan 10 is preferably stamped and formed of heavy paper of the kind known as drawing stock, this paper being of such a composition as may be struck in a die without heat and will hold its shape after the force is removed. The paper should also have a capacity to resist charring under the heat necessary in baking the pie.

The pan has a flat rim 12, sloping sides 14, a flat bottom 16, and partitions 18 having the form of an inverted V separating the pan into quarters. The tops of the partitions 18 have a series of small perforations 20 extending all the way across the partitions and through the rim 12.

The cover 22 is preferably composed of clear transparent Cellophane, and comprises a disc slightly larger in diameter than the rim 12 of the pan, the extending edge of the cover being turned downwardly over the outer edge of the rim as at 24.

The supporting band 26 is made of a single strip of heavy paper stock with a bead 28 of semicircular cross section pressed in the strip intermediate its edges and extending throughout its length.

The pressing in of the bead 28 leaves a groove 30 (see Fig. 4) in the opposite side of the band large enough to receive the edge of the pan with the downturned cover surrounding it. Interlocking notches 32 are provided near the ends of the strip, the notches extending from the edges of the strip inwardly and terminating at the center of the bead 28, the notch at one end being in the edge opposite to that of the notch at the other end.

As an illustration of the use of the container, a pie may be prepared in the pan 10 for baking in the same manner as in any ordinary pan except that the lower crust must be brought up and over the tops of the partitions 18. If the pie has an upper crust, this should be joined to the lower over the tops of the partitions as well as over the rim 12.

After the pie is baked in the pan, a cover 22 is laid over the top. The downturned edges 24 may be preformed, or they may be formed in situ by passing any suitable ring downwardly over the outside of the pan.

The band is now drawn around the outer edge of the pan and downturned edge of the cover and the interlocking notch 32 at one end of the board inserted through the interlocking notch 32 at the other end, the notches being brought over the portions 34 of the band until the bead 28 at one end snaps into the groove 30 at the other end.

The interlocking notches 32 are so positioned as to draw the band 26 taut around the rim and cover when the notches are pressed together, and when a beaded portion of one end of the band snaps into the groove portion of the other end, the band is so joined as to be secure against accidental opening.

A quantity of pies enclosed in containers as above described may be packed for delivery in cartons in layers by placing a sheet of heavy paper between the layers. The restaurateur or vendor, to provide a single serving will preferably remove the band 26 and top cover 22 and break the pie including the pan in two parts along the perforations 20 of one of the partitions 18, then break one of the halves into quarters in the same manner. The paper stock in the pan, although not severely charred from the baking operation will nevertheless break more readily because of it, thus leaving each individual quarter housed in a pan of its own out of which it may be eaten or from which it may be easily removed as desired.

The container is shown in the drawing without a pie in place. It should therefore be understood that when there is a pie in the pan 10, the cover 22 will not lie flat on the top of the rim 12 and partitions 18 exactly as shown but will lie against the rim at the outer edge only, the remaining portion of the cover will lie on the upper crust of the pie where it joins the lower over the rim 12 and partitions 18.

The smaller pan 36, Fig. 5, has a single partition 38 with perforations 40 along the top edge. Somewhat smaller pies may be thus produced for the purpose of breaking into two parts only. A supporting band and cover of smaller dimensions will of course be required. Further modifications within the scope of the following claim will occur to those skilled in the art.

I claim,

A container for baked goods and the like, comprising, in combination, a pan in which the goods is baked made of fibrous sheet stock adapted to char slightly and become breakable after subjection to the baking temperature and having a rim, sloping sides and a bottom formed upwardly in inverted V shape to provide partitions level with said rim, the tops of the partitions and the rim being perforated, whereby the pan may be more readily broken apart midway of the partitions after it is so charred, a disc like cover formed downwardly around the outer edge of the rim and a supporting band having a bead on the outer side and a corresponding groove on its inner side to receive the outer edge of the rim and downturned portion of the cover and having interlocking notches near the ends of the band positioned to hold the band drawn taut around the rim and cover, said interlocking notches extending at right angles from an edge to the middle of said bead, the notch at one end being in the edge opposite to the notch on the other end.

AIMWELL G. MacINTYRE.